United States Patent [19]

Yan

[11] 4,300,860

[45] Nov. 17, 1981

[54] METHOD OF TREATING A SUBTERRANEAN FORMATION TO REMOVE AMMONIUM IONS

[75] Inventor: Tsoung-Yuan Yan, Philadelphia, Pa.

[73] Assignee: Mobil Oil Corporation, New York, N.Y.

[21] Appl. No.: 176,471

[22] Filed: Jul. 25, 1980

[51] Int. Cl.$^3$ .................... C09K 17/00; E21B 43/22
[52] U.S. Cl. .................... 405/263; 166/252; 166/266; 166/305 R; 299/5
[58] Field of Search ............ 166/250, 252, 266, 270, 166/271, 279, 300, 305 R, 307, 267; 299/4, 5; 405/263

[56] References Cited

U.S. PATENT DOCUMENTS

| | | | |
|---|---|---|---|
| 2,352,832 | 7/1944 | Gunderson | 166/279 X |
| 2,782,859 | 2/1957 | Garst | 166/307 X |
| 2,964,380 | 12/1960 | Kolodney et al. | 299/5 UX |
| 3,278,232 | 10/1966 | Fitch et al. | 299/4 |
| 3,309,140 | 3/1967 | Gardner et al. | 299/5 X |
| 3,382,924 | 5/1968 | Veley et al. | 166/305 R |
| 3,482,636 | 12/1969 | Crowe | 166/307 |
| 3,556,221 | 1/1971 | Haws et al. | 166/305 R |
| 3,938,590 | 2/1976 | Redford et al. | 166/271 X |
| 4,079,783 | 3/1978 | Snavely et al. | 166/305 R X |
| 4,114,693 | 9/1978 | Foster et al. | 166/305 R |
| 4,162,707 | 7/1979 | Yan | 166/252 |

FOREIGN PATENT DOCUMENTS 500608 3/1954 Canada ....................... 166/307

*Primary Examiner*—Stephen J. Novosad
*Assistant Examiner*—George A. Suchfield
*Attorney, Agent, or Firm*—Charles A. Huggett; Michael G. Gilman; James F. Powers, Jr.

[57] ABSTRACT

An improved method of restoring a subterranean clay-containing formation having ammonium ions absorbed on the clay, wherein the formation is flushed with a halogenated restoration fluid having a halogen therein which reacts with the ammonium ion in the formation to decompose the ammonium ions is disclosed. The barren ammonia-containing restoration fluid, after it passes through the formation, is withdrawn, reconstituted and recycled as fresh restoration fluid back into the formation. The barren fluid is treated with an appropriate base to raise the pH to a highly alkaline level, the treated highly alkaline barren fluid is passed through an airstripping tower to strip substantially all the ammonia from the fluid, chlorine gas is added to the fluid from which the ammonia has been stripped, while controlling the amount of chlorine to produce a reconstituted restoration fluid of a predetermined pH level. Finally, the reconstituted restoration fluid is recycled back into the formation.

4 Claims, No Drawings

METHOD OF TREATING A SUBTERRANEAN FORMATION TO REMOVE AMMONIUM IONS

FIELD OF THE INVENTION

This invention relates to a method for removing ammonium ions which remain in a subterranean formation after the formation has been subjected to in situ leaching. This application discloses and claims an improvement upon my invention as disclosed and claimed in U.S. Pat. No. 4,162,707, issued July 31, 1979, the disclosure of which is incorporated by reference herein.

BACKGROUND OF THE INVENTION

Complete background information is set forth in my U.S. Pat. No. 4,162,707. Generally speaking, in the typical in situ leaching operation, wells are drilled into a mineral or metal value-bearing formation, in particular one bearing uranium, and a lixiviant is flowed between the wells to dissolve the desired values into the lixiviant. The pregnant lixiviant is produced to the surface, where it is thereafter treated to recover the desired values from the lixiviant. This treatment is usually accomplished by ion exchange. The barren solution, which is the leachate solution after ion exchange, can be recycled into the leaching cycle by adding water and/or lixiviant reagents to restore the barren solution to full utility. As a matter of practice, at least 2% of the lixiviant stream must be withdrawn during each cycle so that ground water will be drawn into the formation. Usually about 5 to 10% of the stream must be withdrawn for each cycle to avoid migration of ammonium ions, etc., outside of the formation being leached.

Unfortunately, many of the known and highly effective lixiviants not only leach the desired values from the formation, but also react with certain formations to give up chemical substances which remain in the formation after the lixiviants pass therethrough. Where ammonium carbonate or ammonium bicarbonate is used in the leach solution, the formation will be contaminated with ammonia, producing the potential of water pollution through contamination of aquifers flowing in or near the formation. Prior to my invention as disclosed in U.S. Pat. No. 4,162,707, none of the processes proposed for rapid restoration of ammonia-contaminated formations seemed to be workable. The method I discovered, which is disclosed in my U.S. Pat. No. 4,162,707, involves the treatment of the formation with a halogenated restoration fluid which preferably comprises chlorinated water and/or a hypochlorite solution to restore the formation quickly and completely to an ecologically acceptable level of ammonium ion concentration. The restoration fluid can also be used to make up fresh restoration fluid for recycle without an additional treatment operation. This is because the chlorine or hypochlorite added to the restoration fluid that is withdrawn through the production well after it has passed through the formation and prior to its being recycled to the injection wells to be introduced to the formation once again attacks the ammonia in the restoration fluid drawn up through the production wells and eliminates it from the solution prior to recycling. I also disclose that the rate efficiency of this restoration process may be improved by adjusting the pH of the chlorinated water and/or hypochlorite restoration fluid with a base such as calcium hydroxide or sodium hydroxide to a value of 7 to 13.

SUMMARY OF THE INVENTION

I have found that it is possible to reduce the amount of chlorine or hypochlorite required to be added to the recycled restoration fluid and to start the ammonia restoration operation itself before the end of the leaching operation. Furthermore, my present invention as disclosed herein has the advantage of avoiding the necessity for a further restoration of the pH of the formation to the pH of the aquifer waters naturally present in the formation.

Since the ammonia ions in the formation are decomposed by a chemical reaction, the chlorine comsumption during the restoration process is proportional to the amount of ammonia in the formation itself, about 6.3 pounds of chlorine being consumed for each pound of ammonia decomposed. This amount is independent of the concentration of the ammonia itself. The same observation applies to the decomposition of ammonia in the barren restoration solution or water produced during restoration from the production wells, as contemplated by U.S. Pat. No. 4,162,707. My present invention reduces chlorine consumption by providing a means to strip the ammonia physically from the barren restoration fluid prior to recycling, in effect by reversing the steps of my prior method.

The pH of the barren solution or water produced in the restoration period is increased to about 11 or 12 by adding an appropriate base. This high pH barren solution is passed downflow through an airstripping tower, in which the airflow is adjusted to strip 80–90% of the ammonia from the barren solution. Chlorine gas is then added to this stripped barren solution, to reduce the pH of the solution to the pH of the aquifer (about 7) or even lower, to about 5 or 6. This chlorinated fluid is then reinjected to the formation to provide a further restoration cycle. The hypochlorite or chlorine water in this reformation fluid decomposes ammonia underground to restore the formation rapidly in the manner described in U.S. Pat. No. 4,162,707. In addition to the chlorine gas added to the stripped barren solution, it is possible to add additional chlorine by dissolving additional sodium hypochlorite or the like into the fluid.

Prior restoration techniques could not be employed until after the in situ leaching operation was completed. The present invention does not interfere with the leaching operation, if the ion exchange process for uranium recovery, for example, can tolerate the increase in chloride ions in the pregnant lixiviant drawn from the production wells. At present, it is possible to perform ion exchange to extract uranium values at chloride concentrations as high as 35,000 ppm. As a result, this process of restoration may be started before the leaching operation has been completed, preferably 2 to 3 pore volumes before the end of the leaching operation. In other words, there may be a 2 to 3 pore volume overlap between the leaching and restoration operations. Of course, the amount of overlap may be increased if the particular ion exchange process employed for metal values recovery can tolerate the amount of chloride ion present in the pregnant lixiviant.

The advantages of the invention as disclosed above, and additional advantages, will be apparent to persons of ordinary skill in this art upon reading this specification and the claims attached.

DETAILED DESCRIPTION OF THE INVENTION

The pH of the barren solution drawn from the production wells either towards the end of the leaching operation or during restoration is increased to a pH of about 11 to 12 from the pH of from about 6.5 to about 8 that it exhibits when it is drawn from the ground by adding caustic soda (NaOH), lime or limewater. This high pH barren solution is then subjected to airstripping in a packed tower, sieve tray tower or the like. Such towers are well known in the art. The airflow employed is between 20 and 300 SCF/gallon of water stripped, with the preferred range being from 50 to 200 SCF/gallon. Ordinarily, 80–95% of the ammonia can be stripped from the pH-adjusted barren solution during the path down the airstripping tower, depending upon the initial concentration of ammonia. Normally, a final ammonia level of about 10 ppm can be achieved. This stripping step will in most cases reduce overall chlorine consumption by about 60 to 80%.

The stripped barren solution is halogenated by the passage of chlorine gas therethrough, reducing the pH of the barren solution down to the pH of the aquifer of about 7, or to a lower pH, and this reconstituted restoration fluid is then reinjected into the formation. The pH of the restoration fluid can be adjusted at will by controlling the quantity of chlorine added. Considering formation conditions usually encountered in the field, the preferable pH of the reconstituted restoration fluid will be within the range of about 4 to about 9, in particular about 5 to about 8. If the passage of chlorine gas into the stripped barren solution is insufficient to provide adequate chlorine concentration, the restoration fluid can be loaded with more chlorine, NaOH, CaO or Ca(OH)$_2$ to some extent. The preferred range of chlorine concentration is from about 1 to about 6 grams per liter.

Pregnant lixiviant or barren restoration fluid is drawn from the production wells, adjusted to high pH, airstripped and reconstituted in a continuous cycle until the ammonia concentration of the produced water is reduced to the desired level. During the restoration period, the water produced always contains ammonia, even though the concentration of ammonia decreases to zero as the restoration operation proceeds to completion. The produced water has to be recycled as the restoration fluid, not only because it is necessary to draw fresh ground water into the formation to be restored in order to reduce the ammonia content of the formation to as low a level as possible, but also because many of the most valuable formations for metal value recovery are located in areas of inadequate water supply.

This invention takes advantage of my discovery that the restoration operation can be carried out with adequate results at a lower pH level than that disclosed in my prior U.S. Pat. No. 4,162,707. In particular, I have discovered that the high pH barren solution should not be directly injected into the formation because it poses the risk of swelling the clays in the formation, thus impairing the permeability of the formation. The increase of pH in the formation also poses the risk of making necessary the restoration of formation pH levels to levels which will be acceptable under applicable environmental regulations. The present invention affords simple and virtually automatic pH control by regulating the amount of chlorine gas introduced to the stripped barren solution.

The foregoing description of my invention has been directed to particular details in accordance with the requirements of the Patent Act and for purposes of explanation and illustration. It will be apparent, however, to those skilled in this art that many modifications and changes may be made without departing from the scope and spirit of the invention. For example, it is apparent that persons skilled in the art may use other means of airstripping than those specifically disclosed herein and further may wish to adjust the pH of the reconstituted restoration fluid to suit the requirements of the particular formation in which the process according to my invention is to be used. It is further apparent that as ion exchange technology advances, it may be possible to increase the amount of overlap between leaching and restoration even further than the amount of overlap disclosed herein. It is further apparent that persons of ordinary skill in this art will, on the basis of this disclosure, be able to practice the invention within a broad range of process conditions. These, and other modifications of the process according to this invention will be apparent to those skilled in the art. It is my intention in the following claims to cover all such equivalent modifications and variations as fall within the true scope and spirit of my invention.

What is claimed is:

1. In the method of treating a subterranean clay-containing formation having ammonium ions absorbed on the clay, wherein the formation is flushed with a halogenated restoration fluid having a halogen therein which reacts with the ammonium ions in the formation to decompose the ammonium ions and wherein the barren ammonia-containing restoration fluid after it passes through the formation is withdrawn, reconstituted and recycled as fresh halogenated restoration fluid into the formation, the improvement comprising the further steps of:
 (a) treating the barren fluid with an appropriate base to raise the pH to a highly alkaline level,
 (b) passing the treated highly alkaline barren fluid through an airstripping tower to strip substantially all the ammonia from said fluid,
 (c) adding chlorine gas to the fluid from which the ammonia has been stripped, controlling the amount of chlorine to produce a reconstituted restoration fluid of predetermined pH level, and
 (d) recycling the reconstituted restoration fluid into the formation.

2. The method of claim 1, wherein the appropriate base is caustic soda, lime or limewater and the highly alkaline pH level of improvement step (a) is from about 11 to 12.

3. The method of claim 1 or 2, wherein the predetermined pH level of the reconstituted restoration fluid is from about 4 to 9.

4. The method of claim 3, wherein the predetermined pH level is from about 5 to 8.

* * * * *